United States Patent
Kanazawa

(12)
(10) Patent No.: US 10,091,371 B2
(45) Date of Patent: Oct. 2, 2018

(54) PROCESSING APPARATUS, IMAGE FORMING APPARATUS, AND NON-TRANSITORY COMPUTER READABLE MEDIUM FOR PRESENTING A CUSTOMIZATION SCREEN

(71) Applicant: FUJI XEROX CO., LTD., Tokyo (JP)

(72) Inventor: Yuki Kanazawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/487,706

(22) Filed: Apr. 14, 2017

(65) Prior Publication Data

US 2018/0115665 A1    Apr. 26, 2018

(30) Foreign Application Priority Data

Oct. 24, 2016   (JP) ................................ 2016-207700

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |
| *H04N 1/44* | (2006.01) |

(52) U.S. Cl.
CPC ..... *H04N 1/00514* (2013.01); *H04N 1/00411* (2013.01); *H04N 1/4433* (2013.01)

(58) Field of Classification Search
CPC .......... H04N 1/00514; H04N 1/00411; H04N 1/4433

USPC ............................... 358/1.15, 1.13, 1.14, 1.1
See application file for complete search history.

(56) References Cited

U.S. PATENT DOCUMENTS

| | | | | |
|---|---|---|---|---|
| 2014/0022579 | A1* | 1/2014 | Edamatsu | G06K 15/1805 358/1.13 |
| 2016/0094737 | A1* | 3/2016 | Sugiura | H04N 1/00432 358/1.15 |

FOREIGN PATENT DOCUMENTS

| | | |
|---|---|---|
| JP | H03-256116 A | 11/1991 |
| JP | 2006-099803 A | 4/2006 |
| JP | 2013-097455 A | 5/2013 |

* cited by examiner

*Primary Examiner* — Douglas Tran
(74) *Attorney, Agent, or Firm* — James A. Oliff

(57) ABSTRACT

A processing apparatus includes a function-screen processing unit and a customization-screen processing unit. The function-screen processing unit arranges setting-item elements in order, the setting-item elements corresponding to respective setting items to be displayed, the setting items being a portion of a group of setting items corresponding to a function provided to a user, and performs processing for presenting, to the user, a function screen on which a customization element for receiving a request for a customization operation is arranged after the arranged group of setting-item elements. The customization-screen processing unit performs, in a case where the user has performed an operation to request the customization operation on the customization element, processing for presenting, to the user, a customization screen through which, for each setting item in the group of setting items, specification of whether the setting item is to be displayed is received.

5 Claims, 9 Drawing Sheets

FIG. 5

| User001 | | | |
|---|---|---|---|
| Copy | | | |
| Preset | Hide | | |
| Output Color | Show | Auto Detect | |
| 2-Sided | Show | 1 Sided | |
| Paper Supply | Show | Auto Detect | |
| Collated | Show | ON | |
| ... | ... | ... | |
| Print | | | |
| Output Color | Show | Auto Detect | |
| 2-Sided | Show | 2 Sided | |
| Paper Supply | Show | Auto Detect | |
| Collated | Show | ON | |
| ... | ... | ... | |
| ⋮ | | | |

PROCESSING APPARATUS, IMAGE FORMING APPARATUS, AND NON-TRANSITORY COMPUTER READABLE MEDIUM FOR PRESENTING A CUSTOMIZATION SCREEN

CROSS-REFERENCE TO RELATED APPLICATIONS

This application is based on and claims priority under 35 USC 119 from Japanese Patent Application No. 2016-207700 filed Oct. 24, 2016.

BACKGROUND

(i) Technical Field

The present invention relates to a processing apparatus, an image forming apparatus, and a non-transitory computer readable medium.

(ii) Related Art

Image forming apparatuses such as printers, scanners, facsimile devices, copiers, and multifunction machines (devices having functions such as a printer function, a scanner function, and a facsimile function) have functions such as a print function, a scan function, and a copy function. For each of the functions, there are many setting items. For example, in the case of the copy function, there are significantly many setting items such as various setting items regarding the number of copies, paper, magnification, a color mode, two-sided copy, sortation, stapling, and image-quality adjustment, various setting items regarding a document reading method, various setting items regarding binding, and many more. Since it is impossible to display all of these great many setting items on a single user interface (UI) screen, a known general image forming apparatus divides a group of setting items into categories, and provides tabbed UI pages corresponding to the respective categories. Each UI page has a size that falls within a display screen of the image forming apparatus, and graphical user interface (GUI) elements for entering inputs regarding some setting items are arranged on the UI page. For example, a group of GUI elements for setting items such as magnification and paper selection for which settings are often changed is arranged on a main page first displayed when the UI screen for the copy function is opened. The UI pages corresponding to the respective categories such as image-quality adjustment, a reading method, and a binding type are prepared behind the main page, and one of the UI pages is displayed in response to selection of a corresponding tab. The GUI elements arranged within the UI pages may include, for example, a button for calling another page to set more detailed items. In this manner, the known tabbed UI screen has a hierarchical structure.

SUMMARY

According to an aspect of the invention, there is provided a processing apparatus including a function-screen processing unit and a customization-screen processing unit. The function-screen processing unit arranges setting-item elements in order, the setting-item elements being display elements corresponding to respective setting items to be displayed, the setting items being a portion of a group of setting items corresponding to a function provided to a user, and performs processing for presenting, to the user, a function screen on which a customization element that is a display element for receiving a request for a customization operation is arranged after the arranged group of setting-item elements. The customization-screen processing unit performs, in a case where the user has performed an operation to request the customization operation on the customization element within the presented function screen, processing for presenting, to the user, a customization screen through which, for each of the setting items in the group of setting items corresponding to the function, specification of whether the setting item is to be displayed is received.

BRIEF DESCRIPTION OF THE DRAWINGS

An exemplary embodiment of the present invention will be described in detail based on the following figures, wherein:

FIG. 5 is a diagram illustrating an example of the content of data of user settings in a setting holding unit;

DETAILED DESCRIPTION

Figure 1:
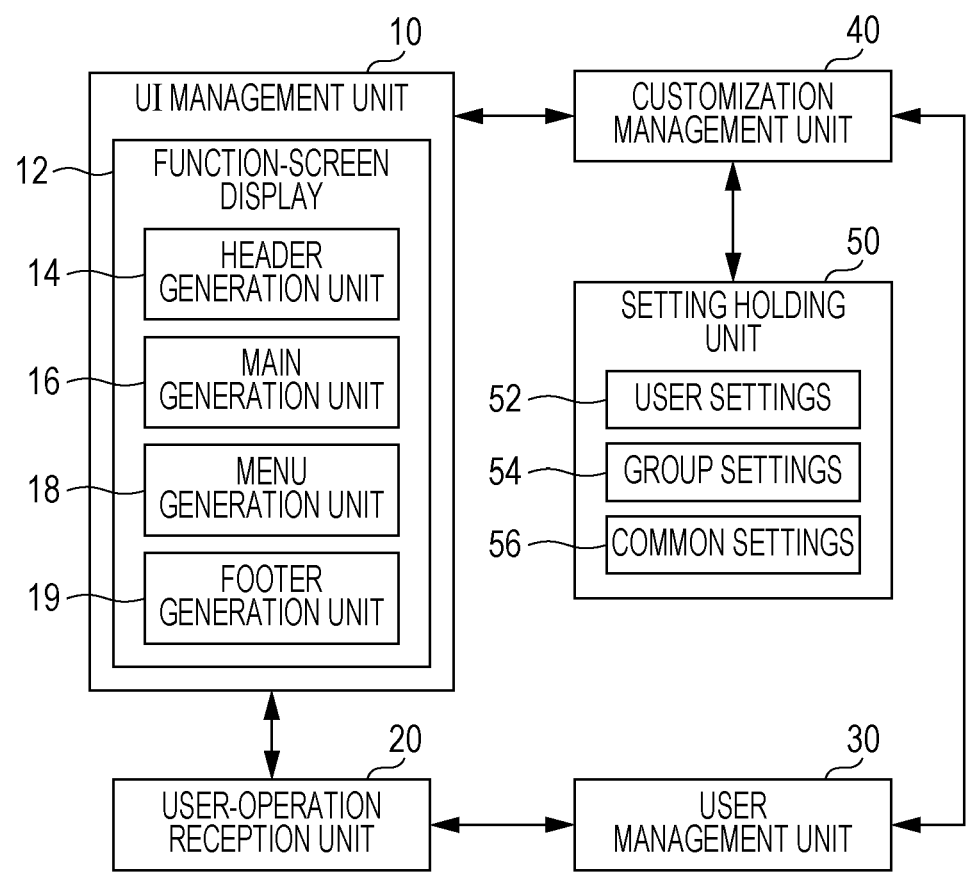
FIG. 1 is a diagram illustrating an example of a functional configuration of a user interface (UI) mechanism of an image forming apparatus according to an exemplary embodiment.

A user interface (UI) mechanism of an image forming apparatus according to an exemplary embodiment will be described with reference to FIG. 1. Examples of the image forming apparatus include a printer, a scanner, a copier, a facsimile, and a multifunction machine (a device having functions such as, for example, a printer function, a scanner function, and a copier function).

The UI mechanism of the image forming apparatus according to the exemplary embodiment includes a UI management unit 10, a user-operation reception unit 20, a user management unit 30, a customization management unit 40, and a setting holding unit 50.

The UI management unit 10 generates a UI screen to be displayed on a display device (for example, a touch panel) of the image forming apparatus, and transfers, to an application in the image forming apparatus, an input from a user through the UI screen. Applications for realizing functions provided by the image forming apparatus to users are installed in the image forming apparatus, the applications including, for example, an application for a copy function and an application for a print function. These applications receive, from the UI management unit 10, commands and values input by a user, and realize processing specified by the user by controlling various units (for example, a paper feed mechanism and a print mechanism) within the image forming apparatus in accordance with these commands and values.

The UI management unit 10 displays a home screen (not illustrated) as one of UI screens on the display device. Buttons corresponding to functions, such as copy, print, scan, and facsimile, provided by the image forming apparatus to users are arranged on the home screen. When a user presses, on the home screen, a button corresponding to a function that the user wants to use, the display device displays a function screen for various settings for the function and for receiving input of an execution command for the function. Display of the function screen is executed by a function-screen display 12.

Figure 2:
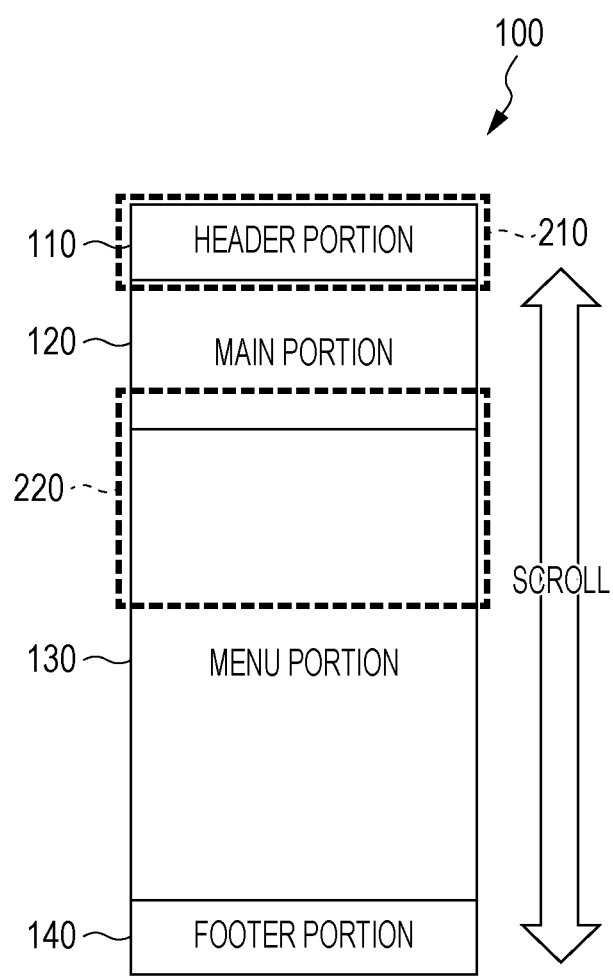
FIG. 2 is a diagram for describing a screen configuration of a function screen of one function.

As illustrated in FIG. 2, a function screen 100 according to the exemplary embodiment includes a header portion 110, a main portion 120, a menu portion 130, and a footer portion 140, which are arranged in order from the top. The header portion 110 is displayed in an upper fixed region 210 of a display screen 200 (see FIG. 3) of the display device. In contrast, the main portion 120, the menu portion 130, and the footer portion 140 are displayed in a scrollable manner in a scrolling region 220 of the display screen 200. The fixed region 210 keeps displaying the header portion 110 even when scrolling is performed for a display range of the scrolling region 220. Various portions of the function screen 100 will be described later with reference to, for example, FIGS. 3 to 4C. A display image of the header portion 110 is generated by a header generation unit 14 in the function-screen display 12. Likewise, images of the main portion 120, the menu portion 130, and the footer portion 140 are generated respectively by a main generation unit 16, a menu generation unit 18, and a footer generation unit 19.

The user-operation reception unit 20 receives operations performed by a user on a UI screen displayed on the display device (a touch panel in this example).

The user management unit 30 performs authentication of a user operating the image forming apparatus. In accordance with authority information (not illustrated) regarding an authenticated user, the user management unit 30 determines a range of operations that the user is allowed to perform.

The customization management unit 40 performs management for UI-screen customization. For instance, as an example, the function screen 100 may be customized in this exemplary embodiment. The function screen 100 is customized by selecting a group of setting items to be displayed in the menu portion 130.

The setting holding unit 50 holds, in a nonvolatile storage device, information specified to be saved, the information being included in setting information regarding the image forming apparatus. The setting information held by the setting holding unit 50 includes settings of function screens 100 for the functions provided by the image forming apparatus to users. The setting information regarding the function screens 100 includes, for example, information specifying setting items to be displayed in the menu portion 130.

In an example, the setting holding unit 50 holds setting information (user settings 52) regarding function screens 100 specific to a user in association with a user ID (identification information) of the user. The user settings 52 are generated or updated, for example, when the user who has logged in to the image forming apparatus performs a customization operation for a function screen 100 among the function screens 100. In addition, the setting holding unit 50 may hold group settings 54 that are setting information regarding function screens 100 set on a group-by-group basis, each group being formed by multiple users. For example, the groups may include groups based on departments within an organization such as a company (for example, a group called "General Affairs Department") and groups based on titles in the organization (for example, a group called "section chiefs and above"). Information regarding a group to which the user belongs may be acquired from, for example, a directory system (not illustrated) of the organization.

Moreover, the setting holding unit 50 holds common settings 56 that are setting information regarding function screens 100 common to all users who use the image forming apparatus. When the image forming apparatus is shipped from the factory, the common settings 56 indicate the content of default settings set by a manufacturer; however, a system administrator of an organization where the image forming apparatus is installed is able to change the content of the settings after the installment.

Next, such a function screen 100 will be described in greater detail with reference to FIGS. 3 to 4C.

Figure 3:
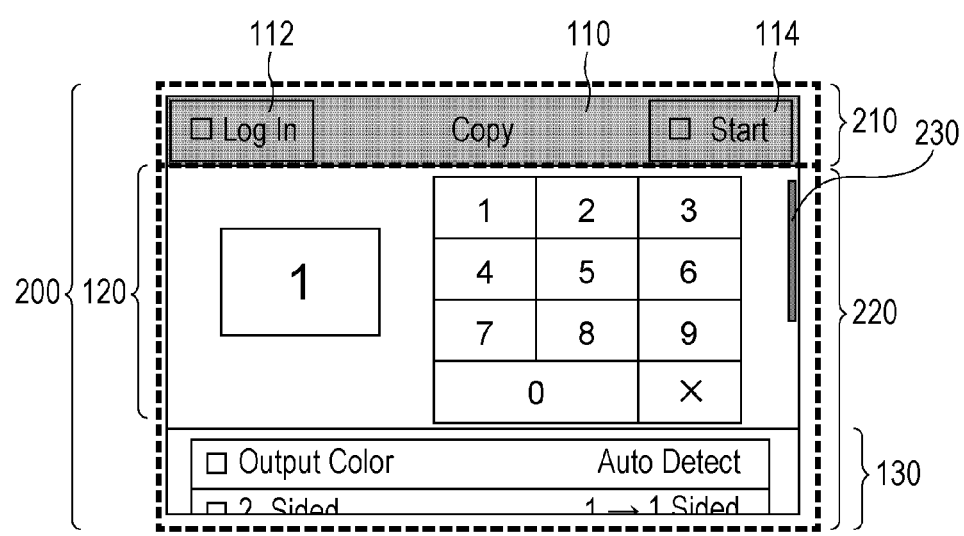
FIG. 3 is a diagram for describing a screen configuration in the case where a function screen is displayed on a display screen of the image forming apparatus.

As illustrated in FIG. 3, the display screen 200 of the display device of the image forming apparatus includes the fixed region 210, which is relatively narrow and located in the upper part of the display screen 200, and the scrolling region 220, which is located below and has a larger area than the fixed region 210.

The header portion 110 of the function screen 100 is displayed in a fixed manner (that is, not scrollable) in the fixed region 210. The header portion 110 displays graphical-user-interface (GUI) parts expected to be used in most cases. In the case of the image forming apparatus, such a GUI part may be a start button 114 for issuing a command to start execution of a function indicated by the function screen 100.

FIG. 3 illustrates a display example of a function screen 100 for the copy function. The header portion 110 displays a label "Copy" indicating the copy function, a login button 112, and the start button 114. In a state in which the user has not yet logged in to the image forming apparatus, when the user presses the login button 112, entry fields for authentication information (for example, a user ID and a password) are displayed on the display screen 200. After the user inputs the authentication information into the entry fields, the user management unit 30 determines whether the authentication information matches authentication information regarding any of registered users (that is, user authentication). The login may be performed before this function screen 100 is opened (for example, when the home screen is displayed), or may also be performed at an arbitrary point in time while this function screen 100 is being displayed. The start button 114 is a button for issuing a command to start execution of the function provided through the function screen 100 (copy in the example illustrated in FIG. 3). When the user presses the start button 114, the content of settings displayed at the moment in the main portion 120 and the menu portion 130 is transferred from the UI management unit 10 to a copy application of the image forming apparatus. The copy application controls various units of the image forming apparatus in accordance with the content of the settings, and executes specified copy processing.

The scrolling region 220 displays, in a scrollable manner, a section of the region constituted by the main portion 120, the menu portion 130, and the footer portion 140 of the function screen 100 (see FIG. 2), the section falling within the range of the display screen 200. Scrolling for a display region within the scrolling region 220 is realized by moving a scroll bar 230 through a finger touch operation.

Figure 4A:
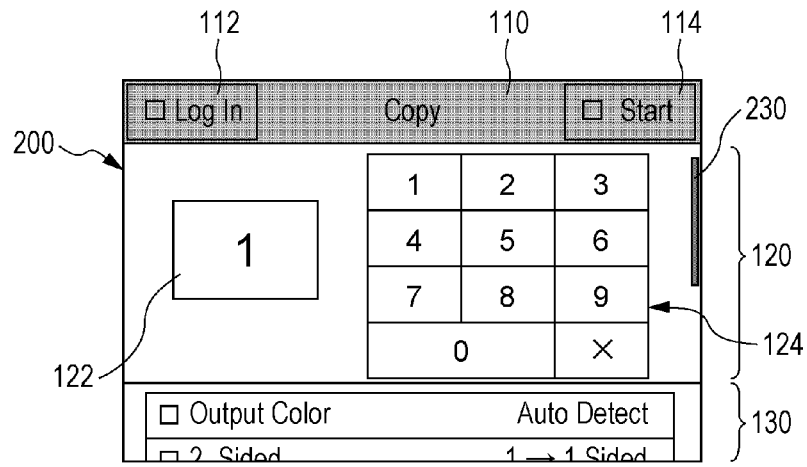
FIGS. 4A to 4C are diagrams for describing the way in which a menu portion and a footer portion of a function screen for a copy function are displayed in a scrolling region of the display screen in a scrollable manner.

The main portion 120 is a screen element for performing setting operations for major setting items regarding the function indicated by the function screen 100. As illustrated in FIG. 4A, when the scroll bar 230 is scrolled to the top of a scrollable range, the main portion 120 is displayed in the scrolling region 220. In the illustrated typical example, the height of the main portion 120 is less than or equal to that of the scrolling region 220. In the example illustrated in FIG. 4A, the main portion 120 displays two GUI parts: a number-of-copies field 122 and a 10-button keypad 124 for inputting the number of copies in the number-of-copies field 122. The number of copies is an item necessary for the copy function, and an initial value (default value) is "1". The number of copies is changed to a number that the user desires every time the user uses the copy function.

Figure 4B:
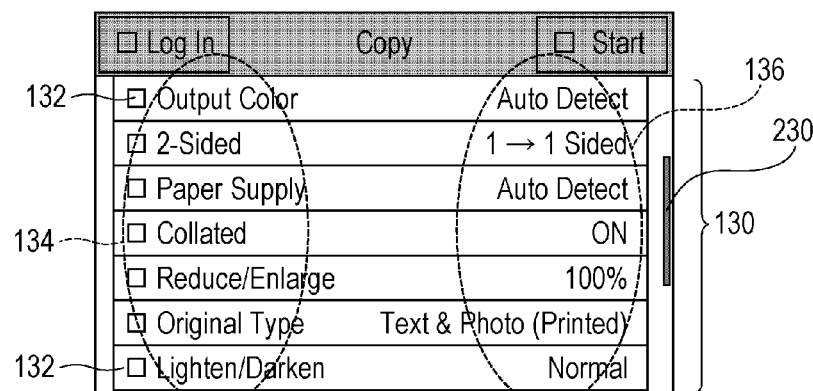
Figure 4C:
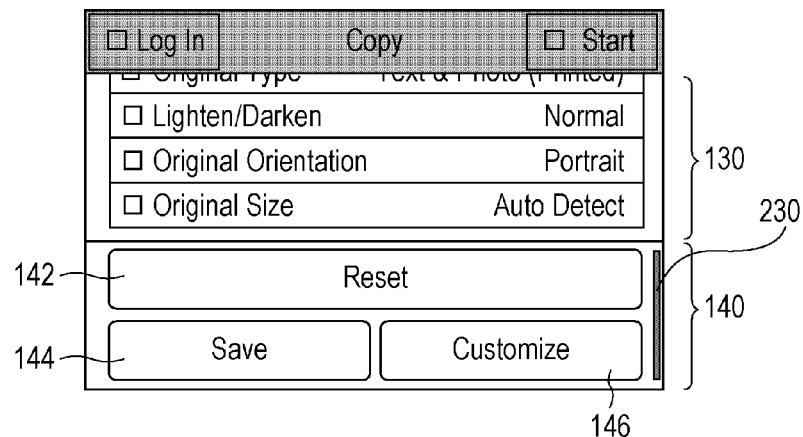

Among the setting items regarding the function, the menu portion 130 displays, in a list and in order from the top, a group of setting items different from those displayed in the main portion 120. FIG. 4B displays a state in which a portion of the menu portion 130 is displayed in the scrolling region 220 by moving the scroll bar 230 downward from the state illustrated in FIG. 4A. As illustrated in FIG. 4B, item names 134 and current set values 136 of respective menu items 132 are displayed in the menu portion 130.

The number of setting items that may be set for a single function, examples of which include copy and print, is significantly large. Thus, when all the setting items are listed as menu items in the menu portion 130, the menu portion 130 will be very long and many scroll operations need to be performed to display all the items. In addition, corresponding default values are preset for these setting items, and the number of setting items for which the user wants to change the set values from the default values is not large. Thus, in the exemplary embodiment, setting items to be displayed in the menu portion 130 may be selectable among all setting items regarding a certain function. For example, the user selects, as menu items to be displayed in the menu portion 130, setting items for which the user may relatively frequently change the set values, and registers this selection result in user settings 52 corresponding to the user ID of the user. In addition, regarding user groups determined on the basis of for example departments and titles, setting items to be displayed in the menu portion 130 may be similarly selected and the selection result may also be registered in the group settings 54. This registration is performed by, for example, a system administrator registered in the image forming apparatus. In addition, the setting items to be displayed in the menu portion 130 when the user is not logged in to the image forming apparatus may also be similarly selected by the system administrator, and the selection result may also be registered in the common settings 56.

The user settings 52, the group settings 54, and the common settings 56 are prioritized and used in this order. That is, when a user is logged in to the image forming apparatus, if the user settings 52 corresponding to the user ID of the user are held by the setting holding unit 50, the menu items 132 to be displayed in the menu portion 130 are selected in accordance with the user settings 52. When there are no user settings 52 corresponding to the user ID of the user who is logged in to the image forming apparatus, if the group settings 54 regarding a group to which the user belongs are held by the setting holding unit 50, the menu items 132 to be displayed in the menu portion 130 are selected in accordance with the group settings 54. When there are neither the user settings 52 nor the group settings 54 corresponding to the user ID of the user or when the user is not logged in to the image forming apparatus, the menu items 132 to be displayed in the menu portion 130 are selected in accordance with the common settings 56. Note that default information regarding a group of setting items determined by the manufacturer of the image forming apparatus and to be displayed in the menu portion 130 are registered in the common settings 56 when the image forming apparatus is shipped from the factory. Thus, in the case where the system administrator of an organization where the image forming apparatus is installed does not change the common settings 56, the default information is used.

FIG. 5 illustrates an example of the content of settings as the user settings 52. This example illustrates the content of settings 300 (hereinafter referred to as setting content 300) as user settings 52 of a user corresponding to a user ID "User001". The setting content 300 includes setting information 310, 320, and so on regarding functions provided by the image forming apparatus to the user such as copy and print. The setting information 310 or 320 regarding a single function includes all setting-item records that the user may set regarding the function (each record being a set of data items of a corresponding one of rows in FIG. 5). Each setting-item record includes an item name 312, a display flag 314, and a set value 316. The display flag 314 is information indicating whether or not to display the setting item in the menu portion 130 of the function screen 100 for the function. In FIG. 5, either of two values, "Show" (display) or "Hide" (not display), is used as the display flag 314. "Show" is used to display the setting item, and "Hide" is used not to display the setting item. The set value 316 is a default value set for the setting item by the user and specific to the user.

For example, the setting information 310 regarding the copy function includes information regarding setting items such as preset information (Preset), an output color mode (Output Color), two-sided copying (2-Sided), a paper-source tray (Paper Supply), and collated output (Collated). Among these setting items, the display flag 314 for the preset information (Preset) is set to "not display" (Hide), and four items from the output color mode (Output Color) to the collated output (Collated) are set to "display" (Show). Note that the setting information 310 regarding the copy function includes many but not illustrated setting items in addition to the illustrated setting items, and those setting items include quite a few setting items set to "Hide" by the user.

In the setting content 300 for the user ID "User001", setting information regarding other functions such as print and scan is also registered.

When the user whose user ID is "User001" logs in to the image forming apparatus, the UI management unit 10 loads user settings 52 corresponding to "User001" into a work memory. The user settings 52 loaded into the work memory indicate a current setting status of functions for the user. When the user selects the copy function from the home screen, the UI management unit 10 displays, in the menu portion 130 as menu items 132, only setting items whose display flags 314 are set to "display" (Show) among the setting items included in the setting information 310 regarding the copy function in the user settings 52 (see FIG. 5). The set values 136 of the menu items 132 displayed in this case are the set values 316 registered in the setting information 310. Since the set values of the menu items on the work memory have not yet been changed at this moment, the set values are the same as the set values in the setting holding unit 50.

Figure 6:
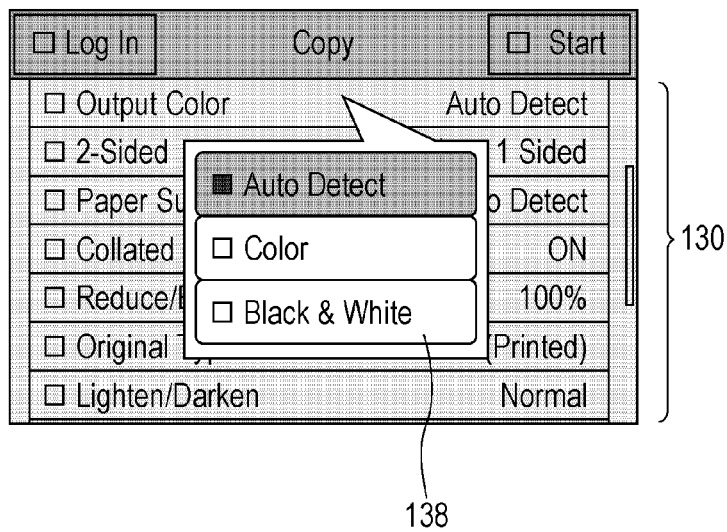
FIG. 6 is a diagram illustrating an example of a state in which one menu item in the menu portion is being operated so that a set value of the menu item is changed.

The user confirms the set values 136 of the menu items 132 in the menu portion 130 (see FIG. 4B) displayed on the display screen 200, and when the user finds a menu item 132 for which the user wants to change its set value among the menu items 132, the user touches the menu item 132 with his or her finger. In response to this touch operation, the UI management unit 10 displays, on the display screen 200, an input dialog for the set value of the touched menu item 132. FIG. 6 illustrates an example of a dialog 138 displayed when the output color mode (Output Color) is touched. The scrolling region 220 behind the dialog 138 is deactivated (a state in which no input is received). The dialog 138 displays, as values for the output color mode, three selectable choices: "automatic detection" (Auto Detect), "color" (Color), and "monochrome" (Black & White). In the example illustrated in FIG. 6, "automatic detection" (Auto Detect) is the current set value, and a check box to the left of "automatic detection" (Auto Detect) is selected (solid black). For example, the user touches the choice "color" (Color) when the user wants to change the current set value to "color" (Color). As a result, the check box to the left of "automatic detection" (Auto Detect) is no longer selected (solid white), and a check box to the left of "color" (Color) is selected. Thereafter the dialog 138 is closed, and the output color mode (Output Color) of the menu portion 130 in the scrolling region 220 is in a state in which the set value thereof is changed to "color" (Color). This change affects the set value of the setting item "output color mode" (Output Color) on the work memory.

Returning back to FIGS. 4B and 4C, the state of the display screen 200 displayed when the scroll bar 230 is moved to the lowest position from the screen in the state illustrated in FIG. 4B is illustrated in FIG. 4C. In this state, the footer portion 140 is displayed at the bottom of the display screen 200, and the bottom portion of the menu portion 130 is displayed above the footer portion 140. The footer portion 140 displays a reset button (Reset) 142, a save button (Save) 144, and a customize button (Customize) 146.

The reset button 142 is a button for resetting the set values of the setting items held in the work memory to an initial state. The initial state in this case is a state at the moment when the user sends a command to display the function screen 100 for the function. In other words, the initial state is the state of a group of set values indicated by the user settings 52, the group settings 54, or the common settings 56 used to display the function screen 100. In addition to the set values of the setting items described above, the value of the number of copies in the number-of-copies field 122 of the main portion 120 may also be reset to an initial value (for example, "1") in response to pressing of the reset button 142.

The save button 144 is a button for saving (storing) information (display flags and set values) regarding the setting items in the work memory. These set values are saved in the user settings 52 used to display the function screen 100. Note that, regarding the menu portion 130 displayed on the basis of the group settings 54 or the common settings 56, general users are not allowed to perform a save operation by pressing the save button 144.

Figure 7:
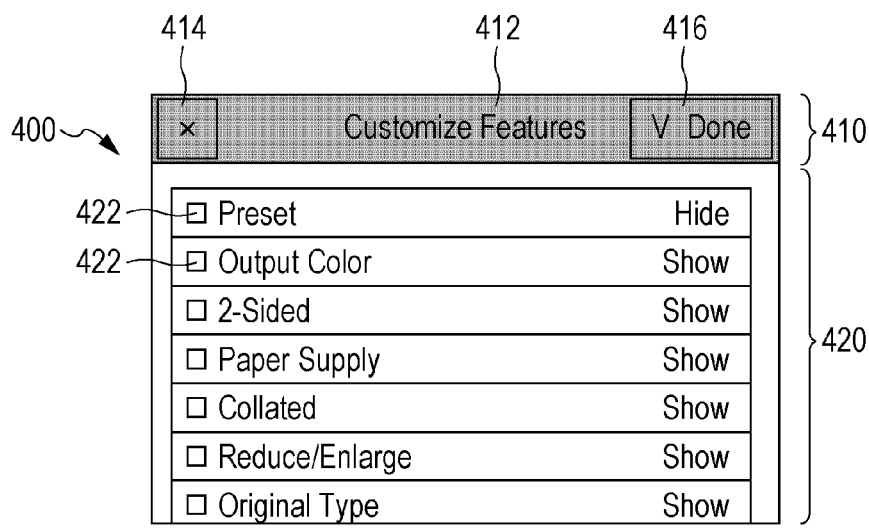
FIG. 7 is a diagram illustrating an example of display of a customization screen.

The customize button 146 is a GUI display element (a customization element) for receiving a command to add or remove setting items to or from the menu portion 130 (that is, to change the display flags 314). In the case where, for example, the user wants to confirm the set value of a setting item that is not displayed in the menu portion 130, the user presses the customize button 146. The UI management unit 10 then displays, on the display screen 200 of the image forming apparatus, a customization screen 400 an example of which is illustrated in FIG. 7. The customization screen 400 is a screen for selecting menu items 132 to be displayed on the function screen 100 (especially the menu portion 130). A header portion of the customization screen 400 is displayed in a fixed region 410 of the display screen 200. This header portion displays a label 412 ("Customize Features") indicating the customization screen 400, a cancel button 414 for canceling customization and returning back to the original function screen 100, and a customization complete button 416 ("Done") for reflecting, on the original function screen 100, setting changes made on the customization screen 400. In addition, all setting items 422 for functions corresponding to the original function screen 100 are listed in a scrolling region 420. Each of the setting items 422 has a field where an item name and a display flag (Hide or Show) are displayed. Scrolling for a display range of the scrolling region 420 may display all the setting items regarding the function on the customization screen 400.

Figure 8:
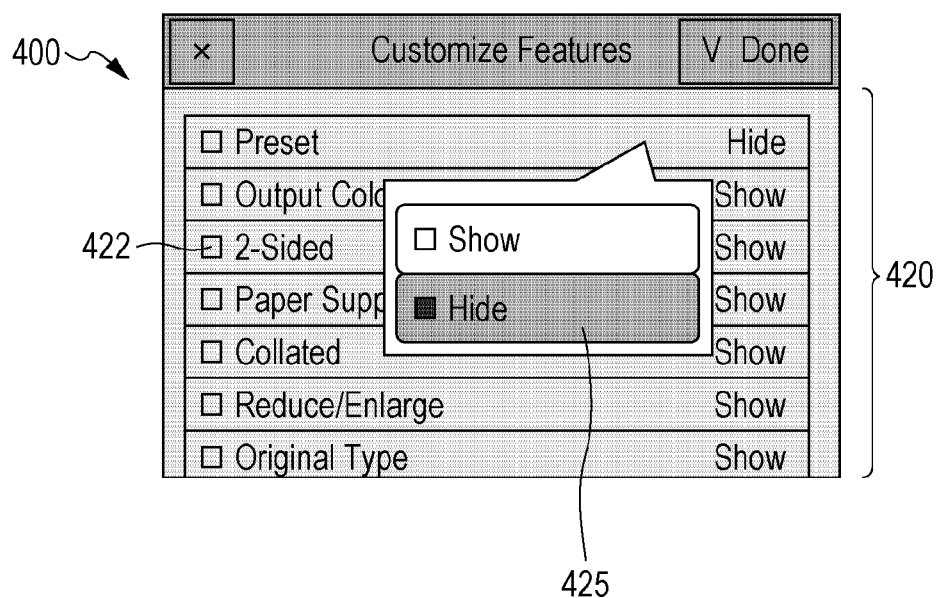
FIG. 8 is a diagram illustrating an example of a state in which one setting item within the customization screen is being operated so that a display flag of the setting item is changed.

When the user wants to change the display flag of a setting item 422 among the setting items 422, the user touches, using his or her finger, the setting item 422 displayed in the scrolling region 420. As illustrated in FIG. 8, the UI management unit 10 displays a dialog 425 for setting the display flag of the touched setting item 422 in response to this touch operation. Choices that are "Hide" (not display) and "Show" (display) are arranged in the dialog 425. In the example illustrated in FIG. 8, the dialog 425 for the setting item "Preset" (preset information) is displayed, and the value "Hide" is currently selected as the display flag. When the user wants the setting item "Preset" to be displayed in the menu portion 130 of the function screen 100 for copy, the user touches and selects the choice "Show" in the displayed dialog 425. When the user wants to hide a setting item 422 having a display flag of "Show" and displayed in the menu portion 130, the user calls the dialog 425 by touching the setting item 422 and selects the choice "Hide" through a touch operation. Changing the display flag through such an operation affects the setting information on the work memory. When the user presses the customization complete button 416 after changing in such a manner the display flags of all setting items 422 that the user has determined need to be changed, the UI management unit 10 forms the menu portion 130 on the basis of the setting information resulting from the change and held in the work memory. Thus, the changed menu portion 130 is displayed on the display screen 200. The user confirms, in the menu portion 130, the set values of the setting items newly set to be displayed as a result of the change, and adds changes to the set values if necessary through the operation described above. Note that when the customization complete button 416 is pressed, the UI management unit 10 may save, in the user settings 52 of the user, the setting states of the display flags of the setting items displayed at that moment on the customization screen 400.

In the case where the user also wants to use the changed menu portion 130 the next time and subsequent times when the user uses the image forming apparatus, the user causes the footer portion 140 to be displayed by scrolling the display screen 200 (see FIG. 4C) and presses the save button 144. In response to this operation, the customization management unit 40 reflects (for example, overwrites), in the user settings 52 of the user in the setting holding unit 50, the setting information on the work memory at the moment when the save button 144 is pressed.

Next, an example of a process performed by the UI mechanism of the image forming apparatus according to the exemplary embodiment will be described with reference to FIGS. 9 and 10.

Figure 9:
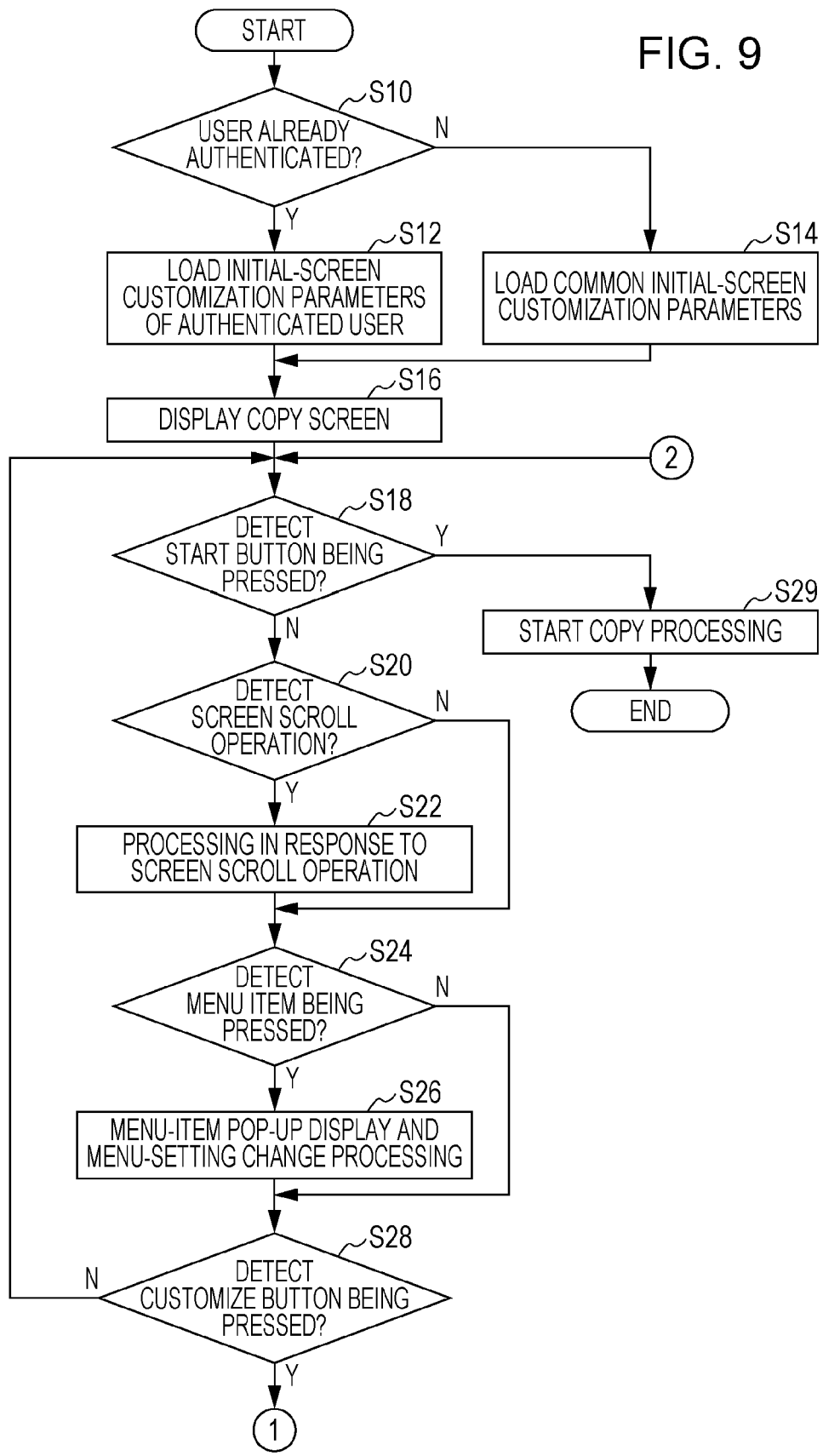
FIG. 9 is a diagram illustrating a portion of a procedure for function-screen display control performed by a UI management unit.

The procedure illustrated in FIG. 9 indicates a process executed when the user presses the button for the copy function on the home screen.

In this case, the UI management unit 10 determines whether the user who is currently operating has been authenticated (S10). In the case where the user has been authenticated, the user settings 52 (initial-screen customization parameters) of the authenticated user are loaded (S12).

In S12, in the case where no user settings 52 corresponding to the user ID of the authenticated user are present in the setting holding unit 50, if the setting holding unit 50 holds group settings 54 corresponding to a group to which the user belongs (the group being determined with reference to a user information database, which is not illustrated), the group settings 54 are loaded. In the case where no such group settings are present either, the common settings 56 are loaded. In such a manner, setting information defining an initial screen (a function screen 100 displayed when a function is called from the home screen) for the authenticated user is loaded in order of priority, that is, in the order of the user settings 52 specific to the user, the group settings 54 of the group to which the user belongs, and the common settings 56.

In the case where it is determined in S10 that the user who is currently operating has not been authenticated, the UI management unit 10 loads the common settings 56 (common initial-screen customization parameters) into the work memory (S14).

Next, the UI management unit 10 displays, on the display screen 200 of the image forming apparatus, the function screen 100 for the copy function in accordance with the setting information loaded into the work memory (S16). In this case, when the menu portion 130 is displayed in the scrolling region 220 of the display screen 200, the menu portion 130 displays, as the menu items 132 (see FIG. 4B), setting items whose display flags indicate "Show" (display) in the setting information regarding the copy function in the work memory, and does not display setting items whose display flags indicate "Hide" (not display).

Hereinafter, the UI management unit 10 periodically monitors touch operations performed by the user on the displayed function screen 100 (S18, S20, S24, and S28).

That is, the UI management unit 10 monitors whether the start button 114 (see FIGS. 4A to 4C) is pressed (S18). Upon detecting that the start button 114 is pressed, the UI management unit 10 commands an application for the copy function to execute copy processing in accordance with the setting information regarding the copy function in the work memory (S29).

In the case where the UI management unit 10 detects a screen scroll operation performed by the user (Yes in S20), the UI management unit 10 performs scrolling for a display range of the scrolling region 220 of the display screen 200 in response to the scroll operation (S22).

In the case where the UI management unit 10 detects that a menu item 132 among the menu items 132 in the menu portion 130 is pressed by the user (Yes in S24), the UI management unit 10 displays, in a pop-up manner, the dialog 138 (see FIG. 6) for the set value corresponding to the menu item 132 (S26). When the user performs an operation to change the set value in the dialog 138, the set value corresponding to the menu item 132 in the work memory is changed in response to the operation.

Moreover, the UI management unit 10 monitors the customize button 146 (S28). In the case where the UI management unit 10 detects that the customize button 146 is pressed (Yes in S28), the process proceeds to S30 of the procedure illustrated in FIG. 10.

In the case where all the determination results in S18, S20, S24, and S28 are No, the process returns to S18 and the procedure is repeated. Note that the order in which determinations for S18, S20, S24, and S28 are performed is not limited to the one illustrated in FIG. 9, and the determinations may be performed in any order.

Figure 10:
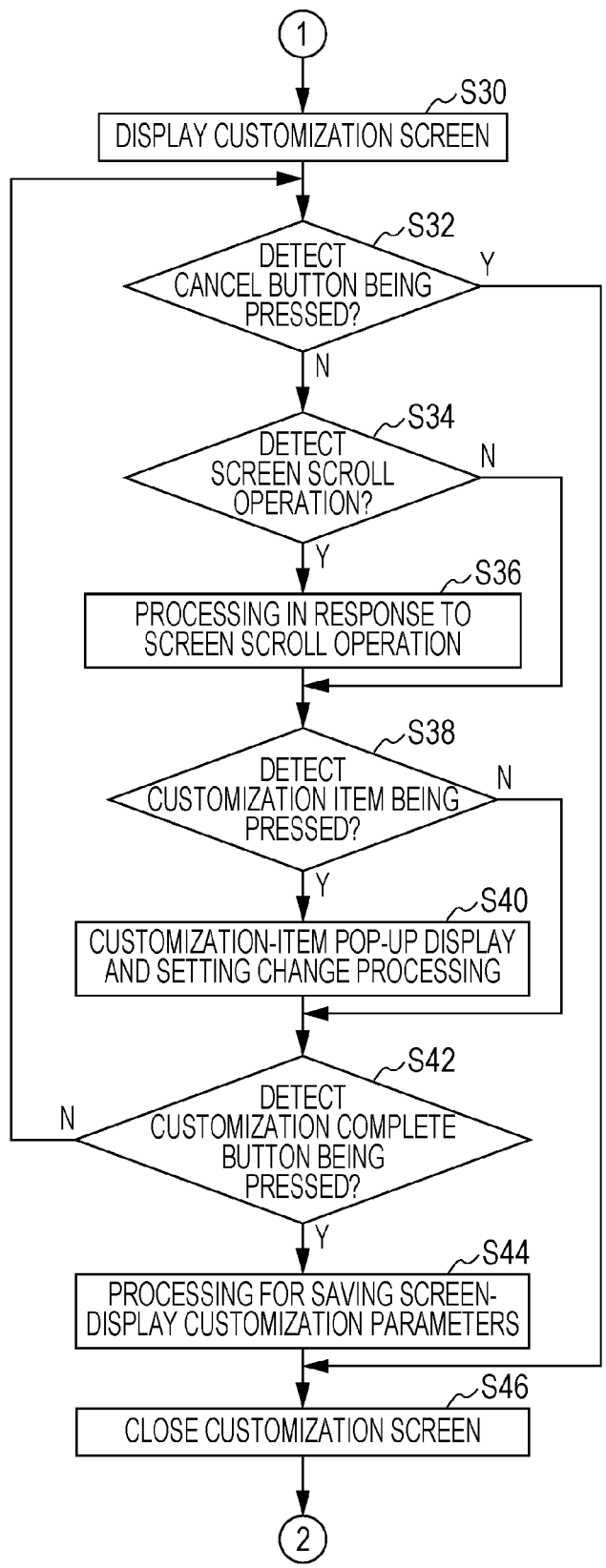
FIG. 10 is a diagram illustrating the rest of the procedure for function-screen display control performed by the UI management unit.

As illustrated in FIG. 10, in S30, the UI management unit 10 displays the customization screen 400 (see FIG. 7). Thereafter, the UI management unit 10 periodically monitors touch operations performed by the user on the displayed customization screen 400 (S32, S34, S38, and S42).

That is, the UI management unit 10 monitors whether the cancel button 414 (see FIG. 7) is pressed (S32). In the case where the UI management unit 10 detects that the cancel button 414 is pressed, the UI management unit 10 closes the customization screen 400 (S46). In this case, the setting states of the display flags of the setting items displayed on the customization screen 400 are not saved, and display of the menu portion 130 of the function screen 100 is not affected.

In the case where the UI management unit 10 detects a screen scroll operation performed by the user (Yes in S34), the UI management unit 10 performs scrolling for a display range of the scrolling region 420 in response to the scroll operation (S36).

Moreover, in the case where the UI management unit 10 detects that a setting item 422 among the setting items 422 in the scrolling region 420 is pressed by the user (Yes in S38), the UI management unit 10 displays, in a pop-up manner, the dialog 425 (see FIG. 8) for switching the display flag of the setting item 422 (S40). When the user performs an operation to change the set value in the dialog 425, the set value corresponding to the setting item 422 in the work memory is changed in response to the operation.

Moreover, the UI management unit 10 monitors whether the customization complete button 416 is pressed (S42). In the case where the customization complete button 416 is not pressed, the process returns to S32. In the case where the customization complete button 416 is pressed, the customization management unit 40 saves, in the user settings 52 of the user, the values of the display flags of the setting items in the work memory (S44). The UI management unit 10 then closes the customization screen 400 (S46).

The UI mechanism according to the exemplary embodiment has been described above.

Information processing in the UI mechanism of the image forming apparatus described above as an example is realized by causing, for example, a computer to execute a program corresponding to the above-described functions of the image forming apparatus. In this case, the computer has a circuit configuration in which, for example, a microprocessor such as a central processing unit (CPU), memory devices (primary storage devices) such as a random access memory (RAM) and a read-only memory (ROM), a controller that controls secondary storage devices such as a flash memory, a solid-state drive (SSD), and a hard disk drive (HDD), various input-output (I/O) interfaces, a network interface for performing control for connection with networks such as a local area network are, as hardware devices, connected to each other via, for example, a bus. A program in which the content of processing for these functions is described is saved in a secondary storage device such as a flash memory among the secondary storage devices via, for example, a network, and the program is installed into the computer. The program stored in the secondary storage device is loaded into the RAM and executed by the microprocessor, which is for example a CPU, and as a result a group of function modules an example of which has been described above is realized.

The image forming apparatus according to the exemplary embodiment has been described above, but a UI mechanism having substantially the same characteristics may be used in processing apparatuses other than the image forming apparatus. Examples of the processing apparatuses include processing apparatuses that execute processing according to some functions, that have groups of setting items for the respective functions, and that receive, for each setting item, setting processing from the user through a screen. Examples of the processing apparatuses include a kiosk terminal and a video device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
a function-screen processing unit that arranges setting-item elements in order, the setting-item elements being display elements corresponding to respective setting items to be displayed, the setting items being a portion of a group of setting items corresponding to a function provided to a user, and that performs processing for presenting, to the user, a function screen on which a customization element that is a display element for receiving a request for a customization operation is arranged after the arranged group of setting-item elements; and
a customization-screen processing unit that performs, in a case where the user has performed an operation to request the customization operation on the customization element within the presented function screen, processing for presenting, to the user, a customization screen through which, for each of the setting items in the group of setting items corresponding to the function, specification of whether the setting item is to be displayed is received.

2. The processing apparatus according to claim 1, further comprising:
an authenticating unit that performs authentication of users who use the processing apparatus; and
a storage unit that stores, for each of the users, display-setting information that specifies the setting items to be displayed on the function screen to be provided to the user, wherein
the function-screen processing unit generates, in accordance with the display-setting information corresponding to a user authenticated by the authenticating unit among the users, the function screen to be presented to the user, and
the customization-screen processing unit updates, in accordance with the specification performed by the user on the customization screen, the display-setting information corresponding to the user and stored in the storage unit.

3. The processing apparatus according to claim 2, wherein
the storage unit further stores, as a piece of display-setting information included in the display-setting information specifying the setting items to be displayed on the function screen, common display-setting information common to the users, and
the function-screen processing unit generates, in a case where the display-setting information corresponding to the user authenticated by the authenticating unit is not stored in the storage unit, the function screen to be presented to the user, in accordance with the common display-setting information.

4. An image forming apparatus comprising:
a function-screen processing unit that arranges setting-item elements in order, the setting-item elements being display elements corresponding to respective setting items to be displayed, the setting items being a portion of a group of setting items corresponding to a function provided to a user, and that performs processing for presenting, to the user, a function screen on which a customization element that is a display element for receiving a request for a customization operation is arranged after the arranged group of setting-item elements; and
a customization-screen processing unit that performs, in a case where the user has performed an operation to request the customization operation on the customization element within the presented function screen, processing for presenting, to the user, a customization screen through which, for each of the setting items in the group of setting items corresponding to the function, specification of whether the setting item is to be displayed is received, wherein
in a case where the function screen is a function screen for a copy function or a print function, the function-screen processing unit performs processing for presenting, to the user as the function screen, a function screen on which a number-of-copies input element for receiving input of a number of copies to be made or a number of copies to be printed is arranged in a region to be first displayed on a display of the image forming apparatus in a case where a command to display the function screen is received, the group of setting-item elements is arranged after the number-of-copies input element, and the customization element is further arranged after the group of setting-item elements.

5. A non-transitory computer readable medium storing a program causing a computer to execute a process for a user interface of a processing apparatus, the process comprising:
arranging setting-item elements in order, the setting-item elements being display elements corresponding to respective setting items to be displayed, the setting items being a portion of a group of setting items corresponding to a function provided by the processing apparatus to a user;
performing processing for presenting, to the user, a function screen on which a customization element that is a display element for receiving a request for a customization operation is arranged after the arranged group of setting-item elements; and performing, in a case where the user has performed an operation to request the customization operation on the customization element within the presented function screen, processing for presenting, to the user, a customization screen through which, for each of the setting items in the group of setting items corresponding to the function, specification of whether the setting item is to be displayed is received.

* * * * *